(12) United States Patent
Børsting et al.

(10) Patent No.: US 9,381,705 B2
(45) Date of Patent: Jul. 5, 2016

(54) METHOD OF MANUFACTURING A LAMINATED PART FROM FIBRE MATERIAL

(75) Inventors: Dennis André Børsting, Kolding (DK); Qinyin Zhou, Årslev (DK); Jacobus Johannes Van Der Zee, Kolding (DK)

(73) Assignee: LM GLASFIBER A/S, Kolding (DK)

( * ) Notice: Subject to any disclaimer, the term of this patent is extended or adjusted under 35 U.S.C. 154(b) by 462 days.

(21) Appl. No.: 13/128,869

(22) PCT Filed: Nov. 11, 2009

(86) PCT No.: PCT/EP2009/064993
§ 371 (c)(1),
(2), (4) Date: Jul. 29, 2011

(87) PCT Pub. No.: WO2010/055060
PCT Pub. Date: May 20, 2010

(65) Prior Publication Data
US 2011/0277929 A1   Nov. 17, 2011

(30) Foreign Application Priority Data
Nov. 12, 2008   (DK) .................................. 2008 01565

(51) Int. Cl.
*B32B 38/04*   (2006.01)
*B29C 70/54*   (2006.01)
(Continued)

(52) U.S. Cl.
CPC ............... *B29C 70/541* (2013.01); *B29C 70/30* (2013.01); *B29C 63/02* (2013.01); *B29C 63/22* (2013.01);
(Continued)

(58) Field of Classification Search
CPC ...... B29C 70/30; B29C 70/541; B29C 70/38; B29C 63/22; B29C 63/02; B29C 70/28; B29L 2031/082; Y10T 156/1052; Y10T 156/12
USPC .......................................................... 156/245
See application file for complete search history.

(56) References Cited

U.S. PATENT DOCUMENTS 5,024,862 A * 6/1991 Frank .................... B26D 7/018
                                                      118/323
5,066,352 A * 11/1991 Albers et al. ................... 156/265
(Continued)

FOREIGN PATENT DOCUMENTS

DE   19833869 C1 *   3/2000
EP   0470901 A1    2/1992
(Continued)

OTHER PUBLICATIONS

International Search Report and Written Opinion received for PCT Patent Application No. PCT/EP2009/064993, mailed on Feb. 12, 2010, 7 pages.
(Continued)

*Primary Examiner* — Philip Tucker
*Assistant Examiner* — Vicki Wu
(74) *Attorney, Agent, or Firm* — Nath, Goldberg & Meyer; Jerald L. Meyer; Tanya E. Harkins

(57) ABSTRACT

A method of manufacturing fiber-reinforced parts, such as blades, for wind power plants, whereby a number of layers (10) of material comprising fiber, such as glass fiber mats, are arranged on a curved surface (5) of an elongated (5) open mold (1) wherein each layer (10) of material is arranged on said curved surface (5) as pre-shaped mats (10) having a form substantially corresponding to an intended area of application such that any need for further modification of or cutting in said material is substantially eliminated.

11 Claims, 1 Drawing Sheet

(51) Int. Cl.
*B29C 70/30* (2006.01)
*B29C 70/38* (2006.01)
*B29C 63/22* (2006.01)
*B29C 63/02* (2006.01)
*B29C 70/28* (2006.01)
*B29L 31/08* (2006.01)

(52) U.S. Cl.
CPC ............... *B29C 70/28* (2013.01); *B29C 70/38* (2013.01); *B29L 2031/082* (2013.01); *Y10T 156/1052* (2015.01); *Y10T 156/12* (2015.01)

(56) References Cited

U.S. PATENT DOCUMENTS

| | | | | |
|---|---|---|---|---|
| 5,135,601 A | * | 8/1992 | Klose et al. | 156/406.4 |
| 5,229,141 A | * | 7/1993 | Mozer | 264/257 |
| 5,735,159 A | * | 4/1998 | Schiavi | 72/275 |
| 2004/0202531 A1 | * | 10/2004 | Beransky et al. | 414/331.18 |
| 2010/0068065 A1 | * | 3/2010 | Jensen | 416/241 R |
| 2010/0084087 A1 | * | 4/2010 | McCowin et al. | 156/267 |

FOREIGN PATENT DOCUMENTS

| | | |
|---|---|---|
| EP | 1749642 A2 * | 2/2007 |
| GB | 2156729 A | 10/1985 |

OTHER PUBLICATIONS

Campbell, Flake C., "Manufacturing processes for advanced composites, Ply Collation: A Major Cost Driver", Jan. 1, 2004, pp. 131-173.

\* cited by examiner

METHOD OF MANUFACTURING A LAMINATED PART FROM FIBRE MATERIAL

CROSS REFERENCE TO RELATED APPLICATIONS

This application is a U.S. National Phase application of PCT/EP2009/064993, filed Nov. 11, 2009, which claims priority to Denmark PA 2008 01565, filed Nov. 12, 2008, the contents of which are hereby incorporated by reference in the present disclosure in their entirety.

According to one aspect, the invention relates to a method of manufacturing fibre-reinforced parts, such as blades, for wind power plants whereby a number of layers of material comprising fibre, such as glass fibre mats, are arranged on a curved surface of an elongated open mould.

BACKGROUND

In the context of manufacturing fibre-reinforced parts, such as blades, for wind power plants, a manufacturing process is typically employed in which a part is moulded in two halves in each their open mould, wherein a coat e.g. of gelcoat is initially applied onto the interior surface of the open mould.

A number of layers of fibre material, or mats, are subsequently arranged in the mould, typically by hand, following which resin is applied, typically by injection into the closed mould, to attach the individual layers of fibre material to each other. The resin can be applied to the layers manually by RTM (resin transfer moulding), VARTM (vacuum assisted resin transfer moulding) or other suitable methods. Alternatively the resin can be applied to the laminate layers prior to laying the layers (Prepeg). In the context of this, gelcoat will harden and form the surface of the product.

The layers are typically provided to the process as rolls comprising an "endless" length of material which are arranged on the mould and subsequently cut to fit the shape of the part to be manufactured.

Arranging and shaping (by cutting) the layers of fibre material within the interior of a mould is today a time-consuming and labour intensive process. Depending of the size of the part to be manufactured, and thereby the size of the mould, walkways may be arranged alongside and/or above the mould such that the workers are allowed to walk along the edge or periphery of the mould and/or above the mould in order to arrange and cut the layers of fibre material as required.

During the layup of fibre material, combined efforts of several workers are required, as the fibre material is heavy and not easy manipulable. Some workers assist in the rollout of material, while other workers positioned along the edge of the mould, make sure that the layers are laid up correctly.

In order to secure a desired shape, visual appearance, strength and stability of the part to be manufactured, it is of outmost importance that the layers are arranged and cut correctly without dents or wrinkles and the like.

Depending on the application and structure of the part to be manufactured, multiple layers of fibre material may be arranged on the mould and the layers are typically arranged on top of each other or next to each other possibly with overlapping edges.

The parts typically consist of as many as fifty or more layers of material, and the parts are typically build up from a main laminate provided in the centre of the mould.

After a layer, which is provided from a roll, is arranged on the mould, the material is cut from the roll. Manufacturing of parts having curvature throughout the length of the part, such as a wing for a wind power plant, may require very long cuts along the edges of the mould.

Moulds for manufacturing such parts may be very large, and the moulds are as a consequence expensive. The time required for the arrangement of material on the mould should be kept at a minimum such that the form time (the time which a part occupies the mould) required by a part to be manufactured is kept at a minimum, thus increasing the overall productivity of the mould.

GB 2156729 A teaches a method of moulding reinforced materials where a pre-impregnated reinforcement material, such as a glass fibre mat, is applied to a moulding process. The reinforcement material may be of "indefinite length", in which case a cutter will be needed for the process of laying up the laminate, or the mat can be provided to the process in pre-cut lengths, where the cuts are provided by a cutting station arranged in the vicinity of the mould. The cutting station is able to cut the material, prior to the material being arranged onto the mould, in a direction substantially transverse to the materials direction of conveyance.

The fibre material is preferably arranged substantially even and flush, which is why any developed dents, wrinkles or curls and the like should be smoothed out. Further, as one layer is typically applied on top of a preceding layer, the lower layer incl. possible additional layers arranged below the lower layer, tend to move or slide within the mould causing the entire layup of fibre material to move away from an intended position within the mould. As a consequence, any manipulation or handling of the material arranged on the mould should be kept at a minimum, which is why a process of manufacture is desired wherein the step of cutting the mats, while the mats are arranged on the mould, is eliminated.

It is thus an object of the invention to provide a solution to the above drawbacks.

This is accomplished by the method of manufacturing a fibre-reinforced part as per the introductory part of this specification, wherein each mat is arranged on the curved surface of the mould as pre-shaped mats having a form substantially corresponding to an intended area of application such that any need for further modification of or cutting in the mat is substantially eliminated.

The method according to the present invention substantially reduces the required form time required by the manufacturing of a part, and further, the method is able to reduce the efforts required by workers in order to lay up the mats.

When, as stated in claim 2, the pre-shaped mats are rolled off or drawn from one or more rolls provided on a gangway or a cart adapted for conveyance along said elongated mould, the odds of damaging the layers during the layup is greatly reduced and the required manpower for the layup minimized.

When, as stated in claim 3, the one or more rolls are arranged as a "revolver drum" comprising a number of rolls each comprising different pre-shaped mats, handling of, and access to the mats accommodated by the rolls are greatly optimized.

According to one embodiment, the pre-shaped mats constitute pre-cut mats cut from one or more rolls of material.

When, as stated in claim 5, the pre-shaped mats are arranged on the mould according to a pattern of predetermined positions, layup speed as well as the quality of the final product is increased.

According to one embodiment, the predetermined positions constitute a pattern established on the mould by means of light.

According to one embodiment the pre-shaped mats are provided from a device adapted to pre-cut an "endless" length of material drawn of a roll.

According to one embodiment, the pre-cut mats are rolled onto one or more rolls and in one or more layers.

When, as stated in claim 10, the pre-shaped mats are provided with a form of identification, control and documentation of the layup is facilitated.

DETAILED DESCRIPTION WITH REFERENCE TO THE FIGURES

Figure 1:
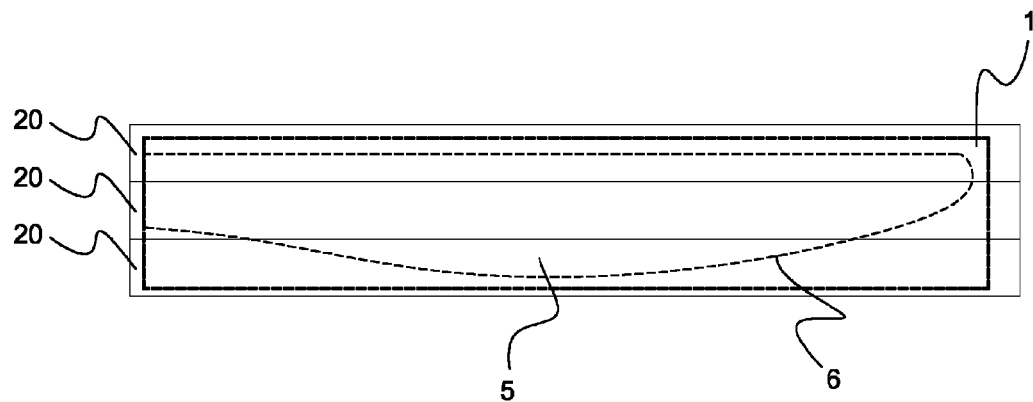
FIG. 1 shows an open mould covered by a layer of fibre mats.

FIG. 1 shows a principal top view of three juxtaposed lengths of fibre material 20 covering an open mould 1 having a curved surface 5 defined by the periphery 6. The mould 1 and the periphery 6 of the curved surface 5 are illustrated by dotted lines.

The mould 1 may typically constitute an elongated mould having a length corresponding substantially to the length of the part or sub-part to be manufactured.

According to today's methods of manufacturing fibre reinforced parts, one or more layers 20, which typically are unrolled from one or more rolls (not shown), are arranged on the mould 1 such that the curved surface 5 is covered.

Upon at least one length of material being arranged such that the curved surface 5 is covered, the material is cut along the edge or periphery 6 such that the length of material, upon being cut, fits an indented position within the mould 1.

Due to a limited width of the material being provided to the mould 1, one layer of material is typically made up from several sub-pieces being arranged, either side by side or with an overlap, on the mould 1.

Superjacent or overlying layers may be arranged on the mould 1 such that the lines or areas wherein subjacent or underlying layers meet are covered by the superjacent or overlying layer, in other words, the position of the matsl being arranged on the mould 1 may shift in directions substantially perpendicular to a longitudinal axis of the mould 1.

As can be seen in the figure, it will typically be necessary to cut along the entire periphery or edge 6 of the curved surface 5.

As the moulds for manufacturing components like blades for wind power plants and the like may be very large, typically in excess of 60 meters, and as many as 50 layers (stacked or piled) or more are arranged on the mould, the process of cutting the material is a tremendous task.

Although not shown in the figures, a main laminate having a relatively great thickness, possibly as much as 50 mm or more and a width of about 800 mm may be arranged on the mould 1.

Further, and not shown in the figures, between the mats, balsa wood may be interposed in order to obtain a desired distance between the layers of mats.

The balsa wood may also be subjects to the method of manufacture according to this specification.

Figure 2:
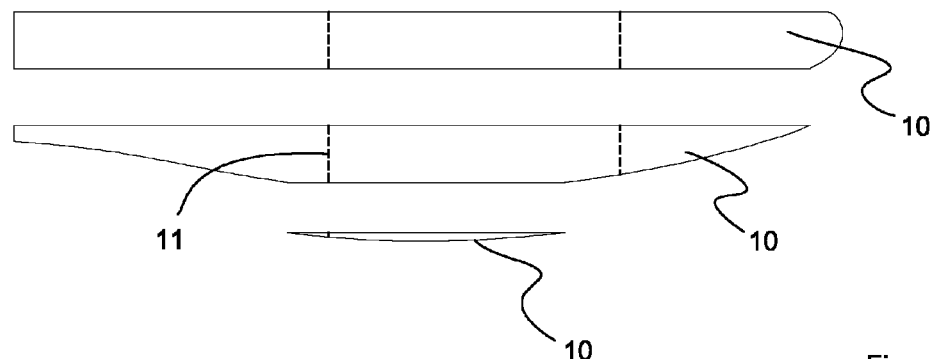
FIG. 2 shows pre-shaped fibre mats.

FIG. 2 shows pre-shaped fibre mats 10 prepared for being arranged onto a mould 1. The pre-shaped mats 10 may be delivered from a sub supplier or manufactured at an adjacent manufacturing station.

The pre-shaped fibre mats 10 may be provided to the process as rolled unto one or more not shown rolls. The rolls may constitute a "revolver drum" (not shown) configured for accommodating two or more rolls, such that fibre mats with varying properties and shaped, may be arranged onto the mould 1 without disturbing the process of laying up one or more layers of fibre material.

The pre-shaped mats may be provided with markings 11 facilitating layup of the mats on the mould 1.

The pre-shaped fibre mats 10 may be produced (fabricated or weaved) such that a particular shape is obtained, or as an equal alternative, cut in shape from a roll of material.

The means for establishing the cuts may constitute cut-rolls, knives/blades, laser, any type of blast-cutting, cutting forms and the like, and the process of pre-shaping the layers may constitute an automated and/or processor controlled process.

Figure 3:
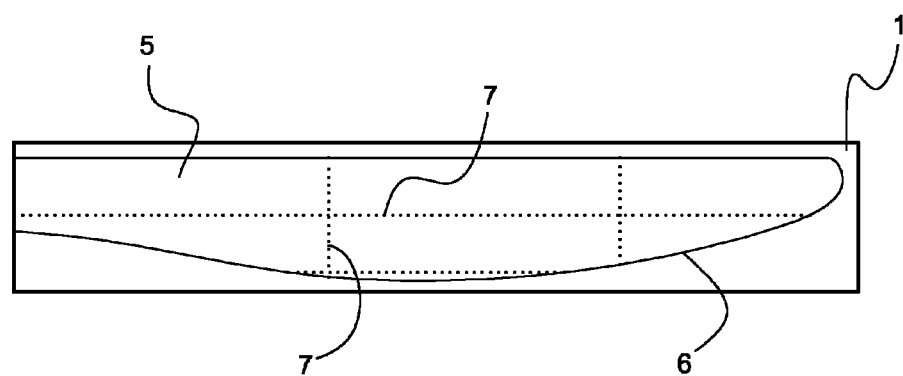
FIG. 3 shows an open mould.

FIG. 3 shows an empty and open mould 1. The method of manufacturing a fibre reinforced part according to the present invention may comprise the step of establishing markings on the curved surface 5 of the mould 1, or on mats arranged on the mould 1, such as illustrated by the dotted lines 7. The markings 7 may be established by lightning or illuminating means (not shown) incl. a laser, provided above the curved surface 5 of the mould 1.

Upon a layer of material, pre-shaped of not, being arranged on the mould 1, a worker may align the material according to the markings 7, such that the intended position of the material on the mould 1 may relatively easily be obtained.

The lightning means may, for various purposes, be able to alter the markings, e.g. such that the markings 7 changes upon finalization of a layup.

Means for recording video or still pictures may be provided such the control and/or documentation of the process of laying up the material may be provided.

The lightning means as well as the camera may be controlled by a not shown processor, such as a computer.

It must be understood that the invention as disclosed in the present description and figures can be modified or amended while continuing to be comprised by the protective scope conferred by the following claims.

The invention claimed is:

1. A method of manufacturing fibre-reinforced parts comprising:
    arranging a number of elongated layers of material comprising fibre on a curved surface of an elongated open mould,
    wherein each elongated layer of material is arranged on said curved surface as pre-cut mats having a form substantially corresponding to an intended area of application such that any need for further modification of or cutting in said material is substantially eliminated, and
    wherein the pre-cut mats are rolled off or drawn from a plurality of rolls provided on a gangway or a cart adapted for conveyance along the elongated open mould, such that different shaped pre-cut mats are drawn from separate rolls, wherein each roll from the plurality of rolls has different shaped pre-cut mats.

2. The method according to claim 1 wherein said plurality of rolls are arranged as a "revolver drum" comprising a number of rolls each comprising different pre-cut mats.

3. The method according to claim 1 wherein said pre-cut mats constitute pre-cut layers cut from one or more rolls of material.

4. The method according to claim 1 wherein said pre-cut mats are arranged on said mould according to a pattern of predetermined positions.

5. The method according to claim 1 wherein said pre-shaped pre-cut mats are arranged on said mould according to a pattern of predetermined positions indicated on said mould, wherein said pattern is established on said mould by means of light.

6. The method according to claim 1 wherein said pre-cut mats are provided from a device adapted to pre-cut said material.

7. The method according to claim 6 wherein said pre-cut mats are rolled onto one or more rolls and in one or more layers.

8. The method according to claim 1 wherein said pre-cut mats are arranged on said form corresponding to the intended area of application according to markings provided on said pre-shaped mats.

9. The method according to claim 1 wherein said pre-cut mats are provided with a form of identification.

10. The method of claim 1, wherein the fibre-reinforced parts are blades for a wind power plant.

11. The method of claim 1, wherein the material comprising fibre are glass fibre mats.

\* \* \* \* \*